Dec. 15, 1925.  1,565,849
V. DURAND, JR
MACHINE FOR MAKING AND FINISHING GLASS BARS, RODS, TUBES,
BOTTLE NECKS, AND THE LIKE
Filed Sept. 5, 1925  2 Sheets-Sheet 1
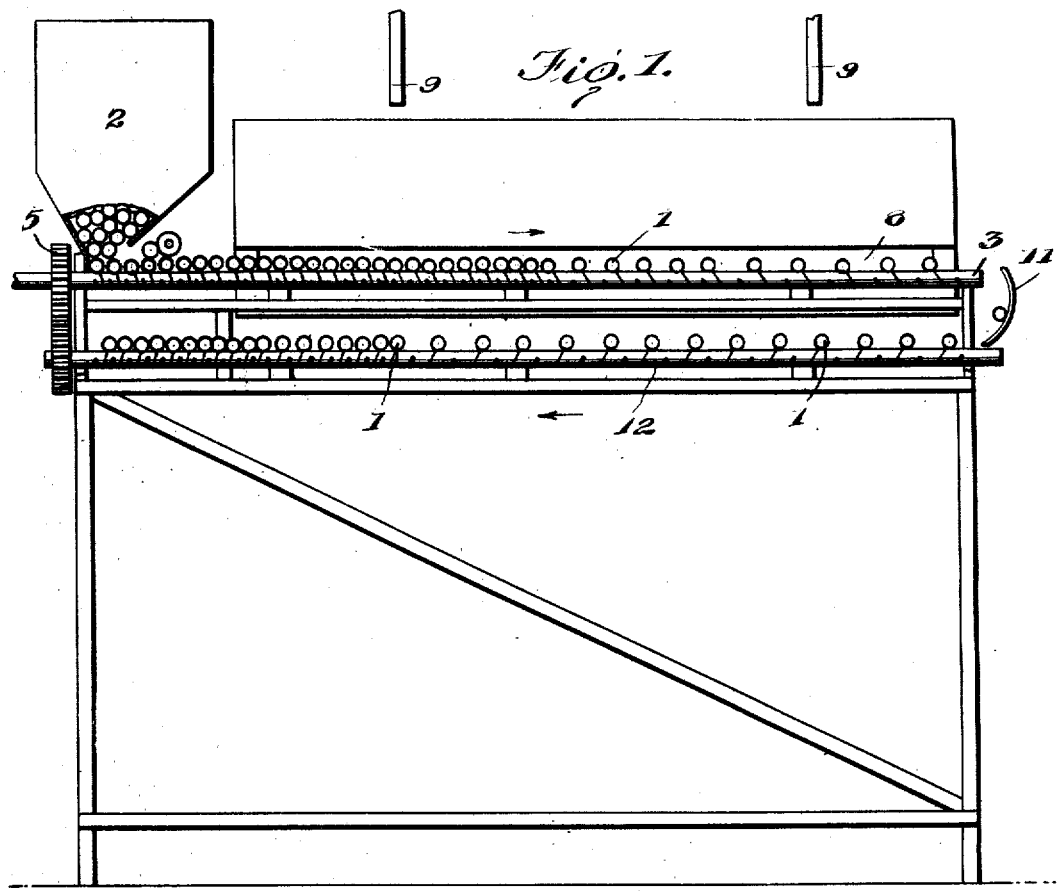
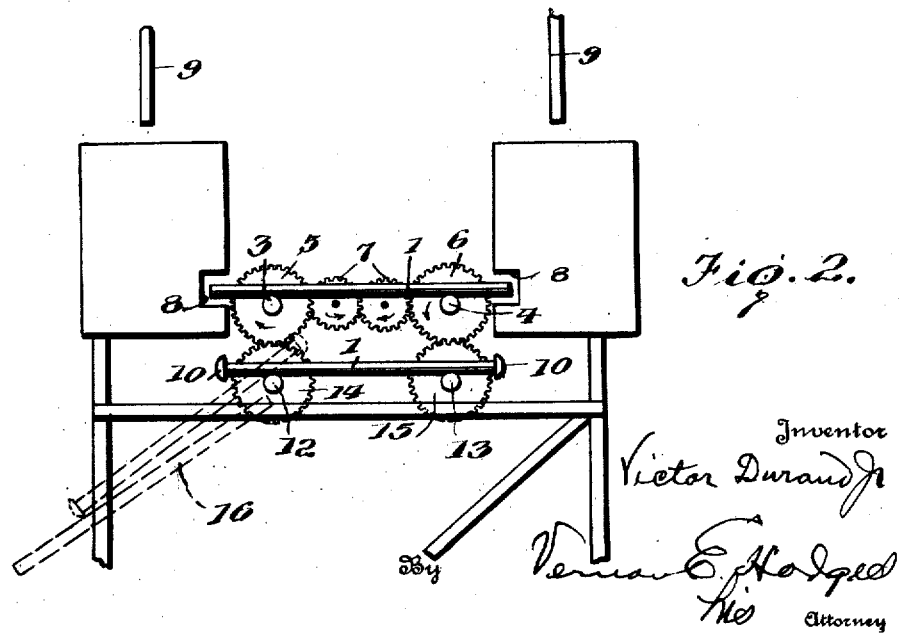

Dec. 15, 1925.                                                    1,565,849
V. DURAND, JR
MACHINE FOR MAKING AND FINISHING GLASS BARS, RODS, TUBES,
BOTTLE NECKS, AND THE LIKE
Filed Sept. 5, 1925                    2 Sheets-Sheet 2

Patented Dec. 15, 1925.

1,565,849

UNITED STATES PATENT OFFICE.

VICTOR DURAND, JR., OF VINELAND, NEW JERSEY.

MACHINE FOR MAKING AND FINISHING GLASS BARS, RODS, TUBES, BOTTLE NECKS, AND THE LIKE.

Application filed September 5, 1925. Serial No. 54,786.

*To all whom it may concern:*

Be it known that I, VICTOR DURAND, Jr., a citizen of the United States, residing at Vineland, in the county of Cumberland and State of New Jersey, have invented certain new and useful Improvements in Machines for Making and Finishing Glass Bars, Rods, Tubes, Bottle Necks, and the like, of which the following is a specification.

My invention relates to an improvement in machines for making and finishing glass bars, rods, tubes, bottle necks, and the like.

This invention consists in mechanical means for feeding the articles successively through the machine, where their ends are heated and rendered semi-plastic preparatory to being fashioned into the shape desired, after which they are conveyed in similar fashion to some convenient point for handling.

In the accompanying drawings.

Fig. 1 is a diagrammatic view in side elevation of the machine;

Fig. 2 is an end view;

Figure 3:
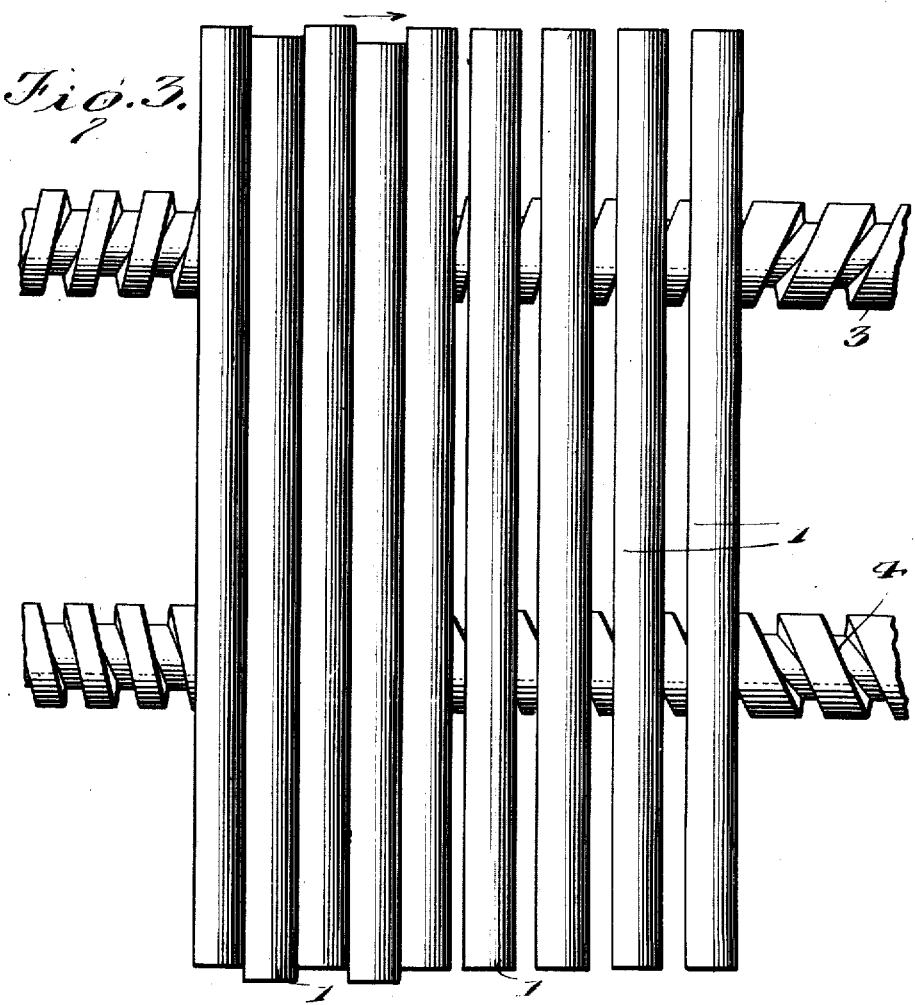
Fig. 3 is an enlarged fragmentary plan view.

The glass articles, or, as illustrated, the rods 1 are placed in a hopper 2, and fed down by gravity upon the two screws 3 and 4, which are provided with gears 5 and 6 respectively to turn in unison and in opposite directions by reason of the two intermediate gears 7 as viewed in Fig. 2.

Figure 4:
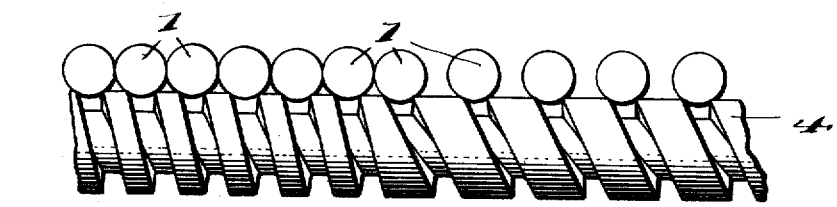
Fig. 4 is an end view.

The pitch of these screws 3 and 4 changes from one end to the other, so that the articles 1 are spread apart as shown in Figs. 1, 3 and 4.

While being conveyed forward, the ends of the bars or other articles 1 pass through the glory-holes 8 as viewed in Figs. 1 and 2, where they are softened by the heat of the furnace. These glory-holes are heated to the required degree in any approved manner, as for instance by the burners 9, of which there may be any number.

Upon reaching the right-hand end or annular passage through the machine, an operator molds the ends of the rods, forming the heads 10 thereon, if they are to be used as towel-bars or the like. It is obvious, however, that they may be fashioned into any shape at this point. They are then carried to a lower level by the conveyer 11 to screws 12 and 13 similar to the screws 3 and 4, which screws are provided with gears 14 and 15 which are driven respectively by the gears 5 and 6 on the screws 3 and 6 respectively. Thus the lower conveyer-screws 12 and 13 are turned in a direction just the reverse of the screws 3 and 4, so that the articles 1 thereon are conveyed back in the opposite direction through the machine beneath the glory-holes. There they go to the end where they started, after which they are slid off on a conveyer 16, as shown in dotted lines in Fig. 2.

It is evident that the rods or bars or other articles being treated may have a slight tendency as they move forward parallel to move slightly endwise back and forth, as has been indicated in Fig. 3; but the main travel is transversely forward in a continuous movement which separates them due to the change of pitch of the feed or conveyer-screws 3 and 4 as their ends become soft to prevent contact with one another. This is repeated in the lower level on the various screws 12 and 13, as illustrated in Fig. 1, to give the bars a chance to cool while running through the furnace, and it is not until they are sufficiently cool to make contact with one another safe, that the pitch of the screws changes a little prior to their reaching their destination at the feed or left-hand end of the machine as viewed in Fig. 1.

A simple and inexpensive method is thus provided for the treatment of glass articles, they in this manner and by the provision of this machine being finished in a single passage through the machine or furnace.

I claim:

1. Means of the character described including feed screws of varying pitch turning in opposite directions to carry articles placed thereon uniformly lengthwise thereof and to separate them at predetermined points in their travel from one another.

2. Means of the character described including feed screws of varying pitch turning in opposite directions to carry articles placed thereon uniformly lengthwise thereof and to separate them at predetermined points in their travel from one another, and heating means through which the ends of the articles pass as they are fed by the screws.

3. Means of the character described including two sets of conveyer-screws, the threads of which vary in width somewhere throughout the length of the screws whereby to feed the articles lengthwise thereof and separate them from one another at predetermined points, means for applying heat to the ends of these articles to soften them, conveyer screws for turning the articles having threads pitched to gradually bring them together just prior to their discharge from the conveyer.

4. Means of the character described including two sets of conveyer-screws, the threads of which vary in width somewhere throughout the length of the screws whereby to feed the articles lengthwise thereof and separate them from one another at predetermined points, means for applying heat to the ends of these articles to soften them, conveyer screws for turning the articles having threads pitched to gradually bring them together just prior to their discharge from the conveyer, and means for conveying the articles from one set of conveyer screws to the other set.

5. Means of the character described including two sets of conveyer-screws, the threads of which vary in width somewhere throughout the length of the screws whereby to feed the articles lengthwise thereof and separate them from one another at predetermined points, means for applying heat to the ends of these articles to soften them, conveyer screws for turning the articles having threads pitched to gradually bring them together just prior to their discharge from the conveyer, and gearing for causing two of the conveyer screws to turn in unison in opposite directions, and the other two conveyer screws in unison in reverse direction, whereby the articles are fed first through the machine in one direction, and then through the machine in the opposite direction.

In testimony whereof I affix my signature.

VICTOR DURAND, JR.

heating means through which the ends of the articles pass as they are fed by the screws.

3. Means of the character described including two sets of conveyer-screws, the threads of which vary in width somewhere throughout the length of the screws whereby to feed the articles lengthwise thereof and separate them from one another at predetermined points, means for applying heat to the ends of these articles to soften them, conveyer screws for turning the articles having threads pitched to gradually bring them together just prior to their discharge from the conveyer.

4. Means of the character described including two sets of conveyer-screws, the threads of which vary in width somewhere throughout the length of the screws whereby to feed the articles lengthwise thereof and separate them from one another at predetermined points, means for applying heat to the ends of these articles to soften them, conveyer screws for turning the articles having threads pitched to gradually bring them together just prior to their discharge from the conveyer, and means for conveying the articles from one set of conveyer screws to the other set.

5. Means of the character described including two sets of conveyer-screws, the threads of which vary in width somewhere throughout the length of the screws whereby to feed the articles lengthwise thereof and separate them from one another at predetermined points, means for applying heat to the ends of these articles to soften them, conveyer screws for turning the articles having threads pitched to gradually bring them together just prior to their discharge from the conveyer, and gearing for causing two of the conveyer screws to turn in unison in opposite directions, and the other two conveyer screws in unison in reverse direction, whereby the articles are fed first through the machine in one direction, and then through the machine in the opposite direction.

In testimony whereof I affix my signature.

VICTOR DURAND, JR.

DISCLAIMER.

1,565,849.—*Victor Durand, jr.,* Vineland, N. J. MACHINE FOR MAKING AND FINISHING GLASS BARS, RODS, TUBES, BOTTLE NECKS, AND THE LIKE. Patent dated December 15, 1925. Disclaimer filed September 22, 1926, by the patentee.

Hereby enters this disclaimer to said Patent No. 1,565,849 in its entirety, and to each and every feature and claim of said Letters Patent.

[*Official Gazette October 12, 1926.*]

DISCLAIMER.

1,565,849.—*Victor Durand, jr.,* Vineland, N. J. MACHINE FOR MAKING AND FINISHING GLASS BARS, RODS, TUBES, BOTTLE NECKS, AND THE LIKE. Patent dated December 15, 1925. Disclaimer filed September 22, 1926, by the patentee.

Hereby enters this disclaimer to said Patent No. 1,565,849 in its entirety, and to each and every feature and claim of said Letters Patent.

[*Official Gazette October 12, 1926.*]